(12) United States Patent
Jasra et al.

(10) Patent No.: US 6,878,657 B2
(45) Date of Patent: Apr. 12, 2005

(54) PROCESS FOR THE PREPARATION OF A MOLECULAR SIEVE ADSORBENT FOR THE SIZE/SHAPE SELECTIVE SEPARATION OF AIR

(75) Inventors: Raksh Vir Jasra, Bhavnagar (IN); Chintansinh Dharmendrasinh Chudasama, Bhavnagar (IN); Jince Sebastian, Bhavnagar (IN)

(73) Assignee: Council of Scientific & Industrial Research, New Delhi (IN)

( * ) Notice: Subject to any disclaimer, the term of this patent is extended or adjusted under 35 U.S.C. 154(b) by 8 days.

(21) Appl. No.: 10/403,475

(22) Filed: Mar. 31, 2003

(65) Prior Publication Data

US 2004/0192537 A1 Sep. 30, 2004

(51) Int. Cl.[7] .................................. B01J 29/70
(52) U.S. Cl. .......................... 502/64; 502/60; 502/63; 502/85
(58) Field of Search .............................. 502/60, 63, 64, 502/85; 95/90, 116, 138

(56) References Cited

U.S. PATENT DOCUMENTS

| | | | |
|---|---|---|---|
| 3,979,330 A | | 9/1976 | Münzner et al. |
| 4,305,845 A | * | 12/1981 | Tu .............................. 502/64 |
| 4,428,281 A | | 1/1984 | Sutt, Jr. |
| 4,453,952 A | * | 6/1984 | Izumi et al. .................. 95/138 |
| 4,477,418 A | | 10/1984 | Mullhaupt et al. |
| 4,481,018 A | | 11/1984 | Coe et al. |
| 4,540,678 A | | 9/1985 | Sutt, Jr. |
| 4,542,115 A | * | 9/1985 | Strack et al. ................. 502/64 |
| 4,557,736 A | | 12/1985 | Sircar et al. |
| 4,627,857 A | | 12/1986 | Sutt, Jr. |
| 4,629,476 A | | 12/1986 | Sutt, Jr. |
| 4,742,042 A | | 5/1988 | Hiraishi et al. |
| 4,746,332 A | * | 5/1988 | Tomomura et al. ........... 95/138 |
| 4,859,217 A | | 8/1989 | Chao |
| 4,880,765 A | | 11/1989 | Knoblauch et al. |
| 4,943,304 A | | 7/1990 | Coe et al. |
| 4,950,312 A | * | 8/1990 | Puppe et al. .................. 95/130 |
| 4,964,889 A | | 10/1990 | Chao |
| 5,004,482 A | | 4/1991 | Haas et al. |
| 5,081,097 A | | 1/1992 | Sharma et al. |
| 5,091,216 A | | 2/1992 | Ekiner et al. |
| 5,114,440 A | | 5/1992 | Reiss |
| 5,126,466 A | | 6/1992 | Ramprasad et al. |
| 5,141,725 A | | 8/1992 | Ramprasad et al. |
| 5,152,813 A | | 10/1992 | Coe et al. |
| 5,174,979 A | | 12/1992 | Chao et al. |
| 5,294,418 A | | 3/1994 | Ramprasad et al. |
| 5,454,857 A | | 10/1995 | Chao |
| 5,464,467 A | | 11/1995 | Fitch et al. |
| 5,698,013 A | | 12/1997 | Chao |
| 5,868,818 A | | 2/1999 | Ogawa et al. |
| 5,945,079 A | | 8/1999 | Mullhaupt et al. |
| 6,030,916 A | | 2/2000 | Choudary et al. |
| 6,087,289 A | | 7/2000 | Choudary et al. |
| 6,180,549 B1 | * | 1/2001 | Mazany et al. ............... 502/64 |
| 6,231,644 B1 | | 5/2001 | Jain et al. |
| 6,680,271 B1 | * | 1/2004 | Heindl et al. ................. 502/64 |
| 2001/0003950 A1 | | 6/2001 | Zhang et al. |
| 2002/0038602 A1 | | 4/2002 | Nelson et al. |

FOREIGN PATENT DOCUMENTS

EP        0 218 403 B1    4/1987

* cited by examiner

Primary Examiner—Christina Ildebrando
(74) Attorney, Agent, or Firm—Luedeka Neely & Graham PC

(57) ABSTRACT

This invention relates to the use of pore mouth control of zeolite NaA for developing a novel molecular sieve adsorbents and their potential in the separation and purification of gaseous mixtures by the size/shape selective adsorption. More specifically, the invention relates to the manufacture and use of a molecular sieve adsorbent, which is selective towards oxygen from its gaseous mixture with nitrogen and argon by pore mouth control of zeolite NaA with liquid phase alkoxide deposition on the external surface at ambient conditions of temperature and pressure. Thus prepared adsorbent is useful for the separation and purification of nitrogen and argon from its mixture with oxygen.

15 Claims, 2 Drawing Sheets

PROCESS FOR THE PREPARATION OF A MOLECULAR SIEVE ADSORBENT FOR THE SIZE/SHAPE SELECTIVE SEPARATION OF AIR

The present invention relates to a process for the preparation of a molecular sieve adsorbent for the size/shape selective separation of air.

The invention relates to the use of pore engineered zeolites as size/shape selective adsorbents in separation of gases having closely related physical properties. More specifically, the invention relates to the preparation and use of a molecular sieve adsorbent, which is selective towards oxygen from its gaseous mixture with nitrogen and/or argon.

FIELD OF THE INVENTION

The use of adsorption techniques to separate a gaseous component from a gaseous stream was initially developed for the removal of carbon dioxide and water from air. Gas adsorption techniques are now conventionally employed in processes for the enrichment of hydrogen, helium, argon, carbon monoxide, carbon dioxide, nitrous oxide, oxygen and nitrogen.

Adsorbents most often effect separations by adsorbing one or more component strongly than another. The various interaction forces engaged in adsorption process are van der Waals interactions, acid-base interactions, hydrogen bond, electrostatic, chelation, clathration and covalent bond. Two important separation mechanisms are exclusion of certain molecules in the feed because they are too large to fit into the pores of the adsorbent (molecular sieving effect, size/shape selective separation) and differences in the diffusion rates of the adsorbing species in the pores of the adsorbent.

The four types of adsorbents dominating in usage are activated carbon, zeolite molecular sieves, silica gel and activated alumina. Carbon molecular sieves (CMS), which exhibits very narrow pore size distribution, facilitates separation based on different inter particle diffusion rates. The efficient separation of air to recover nitrogen has provided a secure and somewhat growing market for carbon molecular sieve.

Adsorption processes for the separation of oxygen and nitrogen from air are being increasingly used for commercial purposes for the last three decades. Oxygen requirements in sewage treatment, fermentation, cutting and welding, fish breeding, electric furnaces, pulp bleaching, glass blowing, medical purposes and in the steel industries particularly when the required oxygen purity between 90 to 95% are being largely met by adsorption based pressure swing or vacuum swing processes. It is estimated that at present, around 20% of the world's oxygen demand is met by adsorptive separation of air. However, the maximum attainable purity by adsorption processes is around 95% with separation of 0.934 mole percent argon present in the air being a limiting factor to achieve 100% oxygen purity. Furthermore, the adsorption-based production of oxygen from air is economically not competitive to cryogenic fractionation of air for production levels more than 200 tonne per day.

Adsorption capacity of the adsorbent is defined as the amount in terms of volume or weight of the desired component adsorbed per unit volume or weight of the adsorbent. The higher the adsorbent's capacity for the desired components the better is the adsorbent as the increased adsorption capacity of a particular adsorbent helps to reduce the amount of adsorbent required to separate a specific amount of a component from a mixture of particular concentration. Such a reduction in adsorbent quantity in a specific adsorption process brings down the cost of a separation process.

The adsorption selectivity of a component over components is calculated as the ratio of the volumes of gas adsorbed at any given pressure and temperature. The adsorption selectivity of a component results from steric factors such as the differences in the size and shape of the adsorbate molecules; equilibrium effect, i.e. when the adsorption isotherms of components of a gas mixture differ appreciably; kinetic effect, when the components have substantially different adsorption rates.

BACKGROUND OF THE INVENTION

The principal characteristic of the separation, removal or concentration of oxygen from the air is that usually there is no cost for the starting material, which is air. The cost of the oxygen produced or removed, depends essentially upon the following factors.

(a) Costs of equipment necessary for separating or concentrating oxygen, (b) Costs of energy necessary for operating the equipment, (c) When purified oxygen is needed, the cost of the purification step has to be taken into account.

Another characteristic is that separation or concentration of oxygen can be achieved either by separating oxygen or by separating nitrogen from air as a starting material.

Taking into consideration the above-described factors, various economically advantageous processes have heretofore been proposed. These include, for example, the process in which the air is liquefied at low temperatures to separate oxygen or nitrogen making use of difference in the boiling point between liquid oxygen (−182.9° C.) and liquid nitrogen (−195.8° C.). The apparatus employed is suited for producing large amounts of oxygen and the production of most of the oxygen and nitrogen in the world is based on this procedure. One disadvantage of the process is that it requires large amounts of power. Another is that large-scale equipment is necessarily site specific and portability is very difficult. Another is that it takes hours for switching on and switching off the plant.

In another approach the membrane separation system has been employed for the separation of oxygen and nitrogen from air [U.S. Pat. No. 5,091,216 (1992) to Hayes et.al. U.S. Pat. No. 5,004,482 (1991) to Haas et.al, U.S. patent application 20020038602 (2002), to Katz; et al.]. The main drawbacks of this method is the thin polymeric films used in the separation process are too weak to withstand the high differential gas pressures required for the separation and the purity of the product gas is only around 50%.

In the prior art, adsorbent which are selective for nitrogen from its mixture with oxygen and argon have been reported [U.S. Pat. No. 4,481,018 (1984) to Coe et.al, U.S. Pat. No. 4,557,736 (1985) to Sircar et.al, U.S. Pat. No. 4,859,217 (1989) to Chao; Chien-Chung, U.S. Pat. No. 4,943,304 (1990) to Coe et.al, U.S. Pat. No. 4,964,889 (1990) to Chao; Chien-Chung, U.S. Pat. No. 5,114,440 (1992) to Reiss; Gerhard, U.S. Pat. No. 5,152,813 (1992) to Coe et.al, U.S. Pat. No. 5,174,979 (1992) to Chao; Chien-Chung et.al, U.S. Pat. No. 5,454,857 (1995) to Chao; Chien-Chung, U.S. Pat. No. 5,464,467 (1995) to Fitch et.al., U.S. Pat. No. 5,698,013 (1997) to Chao; Chien-Chung., U.S. Pat. No. 5,868,818 (1999) to Ogawa et.al., U.S. Pat. No. 6,030,916 (2000) to Choudary et.al., U.S. Pat. No. 6,231,644 to Jaine et al.,]

wherein the zeolites of type A, faujasite, mordenite, clinoptilites, chabazite and monolith have been used. The efforts to enhance the adsorption capacity and selectivity have been reported by exchanging the extra framework cations with alkali and/or alkaline earth metal cations and increasing the number of extra framework cations of the zeolite structure by modifying the chemical composition. The adsorption selectivity for nitrogen has also been substantially enhanced by exchanging the zeolite with cations like lithium and/or calcium in some zeolite types. They have been employed in processes for the separation or concentration of oxygen by removing nitrogen selectively from the air. However, the molecular sieves of these types have an isotherm, which follows Langmuir adsorption isotherm. As a result, when the pressure reaches 1.5 atmospheres absolute (ata) the increase in the adsorptivity is not large compared with the increase in the pressure. Moreover, a very large amount of nitrogen must be separated since the molar ratio of $N_2/O_2$ in the air is 4. Therefore, the advantage achieved by enlargement of the apparatus to permit the use of high pressure is rather small. This limits the application of this process to small volume installations. The maximum attainable oxygen purity by adsorption processes is around 95%, with separation of 0.934-mole percent argon present in the air being a limiting factor to achieve 100% oxygen purity. These adsorbents are highly moisture sensitive and the adsorption capacity and selectivity will decay in the presence of moisture. The chromatographic separation of oxygen and argon is also possible by using these adsorbents.

U.S. Pat. No. 4,453,952 (1984) to Izmi et.al. discloses the manufacture of an oxygen selective adsorbent by substituting the Na cations of zeolite A with K and Fe (II). The adsorbent shows oxygen selectivity only at low temperature and its preparation requires multistage cation exchange, adding to the cost of preparation. Cation exchange is carried out at around 80° C. using aqueous salt solutions of metal ions to be exchanged. This results into higher energy requirement as well as generation of effluents during exchange process. Furthermore, potassium exchange in zeolite leads to lower thermal and hydrothermal stability of the adsorbent.

Carbon molecular sieves are effective for separating oxygen from nitrogen because the rate of adsorption of oxygen is higher than that of nitrogen. The difference in rates of adsorption is due to the difference in size of the oxygen and nitrogen molecules. Since the difference in size is quite small, approximately 0.2 A°, the pore structure of the carbon molecular sieve must be tightly controlled in order to effectively separate the two molecules. In order to improve the performance of carbon molecular sieves, various techniques have been used to modify pore size. The most common method is the deposit of carbon on carbon molecular sieves. For example, U.S. Pat. No. 3,979,330 to Munzner et.al discloses the preparation of carbon containing molecular sieves in which coke containing up to 5% volatile components is treated at 600° C.–900° C. in order to split off carbon from a hydrocarbon. The split-off carbon is deposited in the carbon framework of the coke to narrow the existing pores. U.S. Pat. Nos. 4,528,281; 4,540,678; 4,627,857 and 4,629,476 to Jr. Robert, S. F. disclose various preparations of carbon molecular sieves for use in separation of gases.

U.S. Pat. No. 4,742,040 to Ohsaki et.al. discloses a process for making a carbon molecular sieve having increased adsorption capacity and selectivity by pelletising powder coconut shell charcoal containing small amounts of coal tar as a binder, carbonising, washing in mineral acid solution to remove soluble ingredients, adding specified amounts of creosote or other aromatic compounds, heating at 950° C.–1000° C., and then cooling in an inert gas. U.S. Pat. No. 4,880,765 to Knoblauch et.al., discloses a process for producing carbon molecular sieves with uniform quality and good separating properties by treating a carbonaceous product with inert gas and steam in a vibrating oven and further treating it with benzene at high temperatures to thereby narrow existing pores. Preparation of carbon molecular sieve is a multistep process with utmost care at each stage to get totally reproducible carbon molecular sieve. Additionally, the process is very high temperature process, which results into higher cost of the adsorbent.

U.S. Pat. No. 5,081,097 to Sharma et.al., discloses copper modified carbon molecular sieves for selective removal of oxygen. The sieve is prepared by pyrolysis of a mixture of a copper-containing material and a polyfunctional alcohol to form a sorbent precursor. The sorbent precursor is then heated and reduced to produce a copper modified carbon molecular sieve. Pyrolysis is a high temperature process making the whole process of preparation of the adsorbent an energy intensive process.

Another process uses a transient metal-based organic complex capable of selectively absorbing oxygen [U.S. Pat. No. 4,477,418 (1984) to Mullhaupt Joseph et.al.; U.S. Pat. No. 5,126,466(1992) to Ramprasad et.al.; U.S. Pat. No. 5,141,725(1992) to Ramprasad et.al.; U.S. Pat. No. 5,294,418(1994) to Ramprasad et.al.; U.S. Pat. No. 5,945,079 (1999) to Mullhaupt Joseph et.al; U.S. patent application 20010003950 (2001), to Zhang, Delang et al.]. The absorption by these complexes is reversible with changes in temperature and pressure so that it is theoretically possible to achieve separation or concentration of oxygen by means of a temperature swing or a pressure swing cycle of the air.

However, in practice, severe deterioration of the organic complex occurs with repeated cycles of absorption and liberation of oxygen. Moreover, the organic complex itself is expensive. Therefore, the use of this process is limited to special situations. The main drawback of this process lies in air and moisture sensitivity of the metal complexes used which lowers the stability of the adsorbent produced. Additionally, the cost of the metal complexes used in preparation of the adsorbent is very high.

U.S. Pat. No. 6,087,289 (2000) to Choudary et al. discloses a process for the preparation of a zeolte-based adsorbent containing cerium cations for the selective adsorption of oxygen from a gas mixture. Cerium exchange into zeolite is carried out under reflux conditions using aqueous solution of cerium salt at around 80° C. for 4–8 hours and repeating the exchange process several times. The main drawbacks of this adsorbent lie in observation of oxygen selectivity only in the low-pressure region. Furthermore, adsorbent preparation is a multi-step ion exchange process, which also generates liquid effluent.

European Patent 0,218,403 to Greenbank discloses a dense gas pack of coarse and fine adsorbent particles wherein the size of the largest fine particles is less than one-third of the coarse particles and sixty percent of all particles are larger than sixty mesh. Although not specifically stated, it is evident from the examples that these percentages are by volume. This system is designed primarily for enhancing gas volume to be stored in a storage cylinder. It is mentioned, however, that it can be utilized for molecular sieves. There is nothing in this application, however, which would give insight into the fact that significantly enhanced PSA efficiency could be obtained by combining coarse and fine particles of kinetically-selective sieve material in a single bed. It has been found in accordance with the present invention that, within certain limits as will be defined, a mixture of coarse and fine kinetically selective sieve particles will unexpectedly give enhanced PSA performance.

In another approach chemical vapour deposition technique was used for controlling the pore opening size of the zeolites by the deposition of silicon alkoxide [M. Niwa et al., J C S Faraday Trans. I, 1984, 80, 3135–3145; M. Niwa et al., M. Niwa et al., J. Phys. Chem., 1986, 90, 6233–6237; Chemistry Letters, 1989, 441–442; M. Niwa et al., Ind. Eng. Chem. Res., 1991, 30, 38–42; D. Ohayon et al., Applied Catalysis A-General, 2001, 217, 241–251]. Chemical vapour deposition is carried out by taking a requisite quantity of zeolite in a glass reactor, which is thermally activated at 450° C. in situ under inert gas like nitrogen flow. The vapours of silicon alkoxide are continuously injected into inert gas stream, which carries the vapours to zeolite surface where alkoxide chemically reacts with silanol groups of the zeolite. Once the desired quantity of alkoxide is deposited on the zeolite, sample is heated to 550° C. in air for 4–6 hours after which it is brought down to ambient temperature and used for adsorption. The major disadvantages of this technique are (i) Chemical vapour deposition, which leads to non-uniform coating of alkoxide which in turn results in non-uniform pore mouth closure, (ii) The process has to be carried out at elevated temperature where the alkoxide gets vaporised, (iii) The deposition of the alkoxide requires to be done at a slow rate for better diffusion and (iv) This method is expensive and lack of a commercial level at higher scale will be difficult.

At present nitrogen and argon containing less than 10 ppm oxygen is produced by using a deoxo hybrid system in which the oxygen is removed by reducing it to water over a catalyst with hydrogen.

OBJECT OF THE INVENTION

The main object of the present invention is to provide a process for the preparation of a molecular sieve adsorbent for the size/shape selective separation of air, which obviates the drawbacks as detailed above.

Still another object of the present invention is to provide an oxygen selective zeolite based adsorbent from its gaseous mixture with nitrogen and argon.

Still another object of the present invention is to provide an adsorbent, which can be prepared by the external surface modification of the zeolite A.

Yet another object of the present invention is to provide an oxygen selective adsorbent by a simple liquid phase surface modification of zeolite A.

Yet another object of the present invention is to have a uniform deposition of alkoxide on the surface of zeolite A.

Yet another object of the present invention is to provide an adsorbent with high thermal and hydrothermal stability.

Yet another object of the present invention is to provide an adsorbent, which is selective to oxygen over nitrogen and argon and can be used commercially for the separation and purification of nitrogen and argon.

In the drawings accompanying this specification,

SUMMARY OF THE INVENTION

Figure 1:
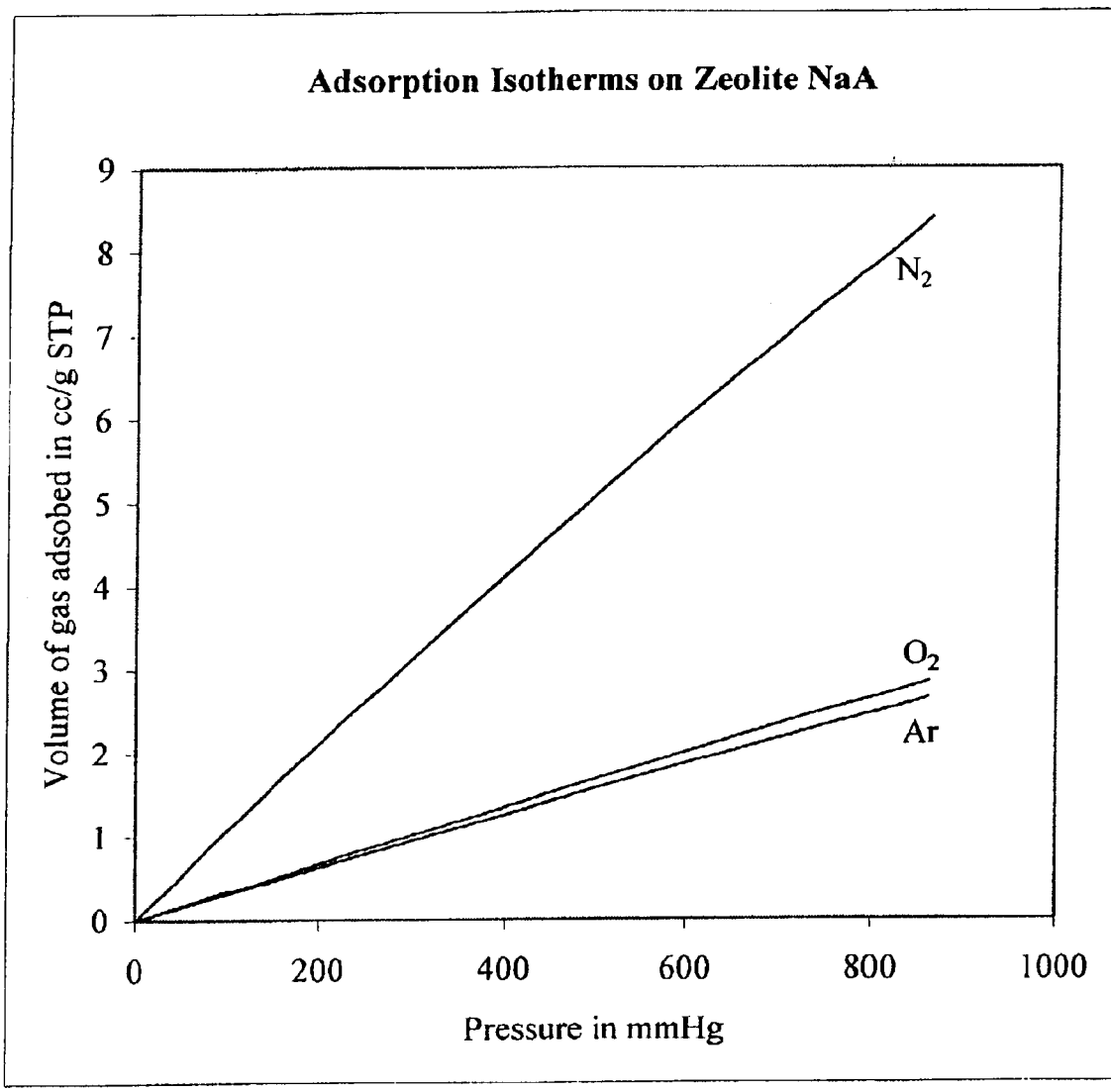
FIG. 1 represents the adsorption isotherms of nitrogen, argon and oxygen at 15° C. on the adsorbent obtained from example-1.
Figure 2:
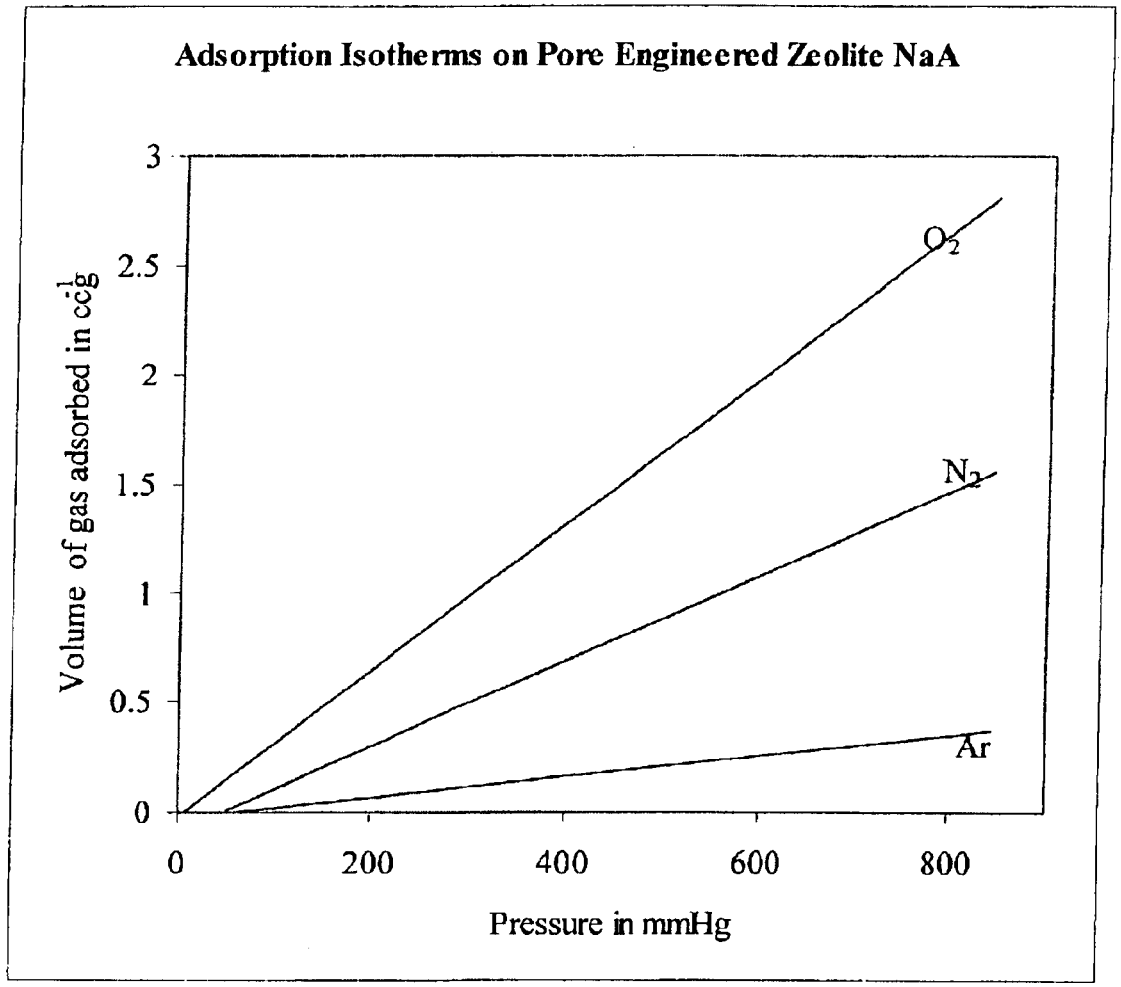
FIG. 2 represents the adsorption isotherms of nitrogen, argon and oxygen at 15° C. on the adsorbent obtained from example-6.

Accordingly, the present invention provides a process for the preparation of a molecular sieve adsorbent for the size/shape selective separation of air, which comprises of a molecular sieve adsorbent represented by the general formula, $(Na_2O)_6.(Al_2O_3)_6.(SiO_2)_{12+x}.wH_2O$ where the values of x varies from 0.001 to 0.1, w being the number of moles of water, which comprises (1) activating the commercially available zeolite A in the temperature range of 350 to 450° Celsius to eliminate physically adsorbed water, for a period ranging from 3 to 6 hours; (2) cooling the activated zeolite in a desiccator under vacuum in the range of $1\times10^{-2}$ to $1\times10^{-4}$ mm Hg; (3) treating the cooled zeolite with tetra alkyl ortho silicate dissolved in a dry solvent in the concentration range of 0.1 to 1.0 wt %/volume for a specified period in the range of 4 to 8 hours under continuous stirring; (4) recovering the solvent by conventional techniques for re-use; (5) drying the treated zeolite in air in static condition at ambient temperature in the range of 20 to 35° Celsius; (6) heating the modified zeolite in the temperature range of 450 to 600° Celsius for a period ranging from 3 to 8 hours; (7) cooling the zeolite at ambient temperature in static condition; (8) measuring the adsorption of oxygen, nitrogen and argon by a static volumetric system, prior to it the zeolite samples were activated in the temperature range of 350 to 450° Celsius.

In an embodiment of the present invention commercially available zeolite A may used for the preparation of the molecular sieve adsorbent.

In another embodiment of the present invention the zeolite-A was activated at 350 to 550° C. for 3–6 hours followed by cooling under inert or vacuum condition.

In another embodiment of the present invention the tetra alkyl ortho silicate was dissolved in dry solvent, which may be selected from like toluene, benzene, xylene and cyclohexane.

In another embodiment of the present invention 0.10 to 1.00 weight percentage of tetra alkyl ortho silicate may be deposited onto the zeolite in a single step by treating the activated zeolite with a solution of tetra alkyl ortho silicate in dry solvent for 4 to 8 hours.

In still another embodiment of the present invention the said tetra alkyl ortho silicate may be deposited onto the zeolite at tetra alkyl ortho silicate concentration of 0.10 to 1.00% by weight of the zeolite.

In still another embodiment of the present invention the alkoxide deposition may be carried out in liquid phase for a period ranging from 4 to 8 hours under continuous stirring at ambient temperature.

In still another embodiment of the present invention the alkoxide deposition may be uniform on the surface of the zeolite.

In still another embodiment of the present invention the solvent was recovered by distillation method preferably under vacuum distillation and can be re-used.

In still another embodiment of the present invention the adsorbents are dried in air or under vacuum conditions.

In still another embodiment of the present invention the adsorbent is calcined in the temperature range 500 to 600° C. preferably at 550° C.

DESCRIPTION OF THE INVENTION

In the present invention, we report a novel process to control the pore size of zeolite A, which has oxygen adsorption selectivity over nitrogen and argon. Furthermore this adsorbent displays high thermal and hydrothermal stability.

Zeolites, which are microporous crystalline alumna-silicates, are finding increased applications as adsorbents for separating mixtures of closely related compounds. Zeolites have a three dimensional network of basic structural units consisting $SiO_4$ and $AlO_4$ tetrahedrons linked to each other by sharing apical oxygen atoms. Silicon and aluminium atoms lie in the centre of the tetrahedral. The resulting alumno-silicate structure, which is generally highly porous, possesses three-dimensional pores the access to which is through molecular sized windows. In a hydrated form, the preferred zeolites are generally represented by the following formula, $M_{2/n}O.Al_2O_3.xSiO_2.wH_2O$ where M is a cation, which balances the electrovalence of the tetrahedral and is generally referred to as extra framework exchangeable cation, n represents the valency of the cation and x and w represents the moles of $SiO_2$ and water respectively.

The attributes which makes the zeolites attractive for separation include, an unusually high thermal and hydro-thermal stability, uniform pore structure, easy pore aperture modification and substantial adsorption capacity even at low adsorbate pressures. Furthermore, zeolites can be produced synthetically under relatively moderate hydrothermal conditions.

Structural analysis of the samples was done by X-ray diffraction where in the crystallinity of the zeolites are measured from the intensity of the well-defined peaks. The in situ X-ray powder diffraction measurements at 30° C., 100° C., 200° C., 300° C., 400° C., 500° C., 600° C., 650° C., 700° C., 750° C., 800° C. and 850° C. shows that the newly developed adsorbent have high thermal stability. X-ray powder diffraction was measured using PHILIPS X'pert MPD system equipped with XRK 900 reaction chamber.

The zeolite NaA powder $[Na_{12}(AlO_2)_{12}(SiO_2)_{12}wH_2O]$ was used as the starting material. X-ray diffraction data showed that the starting material was highly crystalline. A known amount of the zeolite NaA powder $[Na_{12}(AlO_2)_{12}.(SiO_2)_{12}.wH_2O]$ was activated at 400° C. to remove the water adsorbed in the zeolite and mixed thoroughly with a solution having known amount of tetra alkyl orthosilicate in 100 ml dry solvent, the sample was dried by evaporating solvent under reduced pressure and the tetra alkyl ortho silicate species deposited on the zeolite surface was converted into silica by calcinations of the zeolite at 550° C.

Oxygen, nitrogen and argon adsorption at 15° C. was measured using a static volumetric system (Micromeritics ASAP 2010), after activating the sample at 350° C. to 450° C. under vacuum for 4 hours as described in the Examples. Addition of the adsorbate gas was made at volumes required to achieve a targeted set of pressures ranging from 0.5 to 850 mmHg. A minimum equilibrium interval of 5 seconds with a relative target tolerance of 5.0% of the targeted pressure and an absolute target tolerance of 5.000 mmHg were used to determine equilibrium for each measurement point.

The selectivity of pure components of two gases A and B is given by the equation, $$\alpha_{A/B} = [V_A/V_B]_{P,T}$$

where $V_A$ and $V_B$ are the volumes of gas A and B adsorbed at any given pressure P and temperature T.

The important inventive steps involved in the present invention are that the molecular sieve adsorbent obtained by the control of the pore mouth of the zeolite (i) by the deposition of silica by chemically reacting alkoxide with silanol groups present on the external surface of the zeolite followed by calcination at 500–600° C. (ii) by liquid phase chemical reaction of tetra alkyl orthosilicate in moisture free solvent to ensure uniform deposition of silica on the surface of the zeolite at ambient conditions, (iii) enhancement of thermal and hydrothermal stability of the adsorbent by silica deposition on the external surface of the zeolite (iv) to prepare zeolite based oxygen selective adsorbent based on shape/size selectivity by a method other than conventionally used cation exchange.

The following examples are given by way of illustration and therefore should not be constructed to limit the scope of the present invention.

EXAMPLE-1

A known amount of zeolite NaA, $[(Na_2O)_6.(Al_2O_3)_6.(SiO_2)_{12}.wH_2O]$, was activated at 350° C. under vacuum and adsorption measurements were carried out as described earlier. The adsorption capacity for oxygen is 3.48 cc/g at 15° C. and 765 mmHg and selectivity for nitrogen over oxygen is around 3 to 5 in the pressure range studied, the values are given in table 1.

EXAMPLE-2

10.0 g of the zeolite NaA powder $[Na_{12}(AlO_2)_{12}.(SiO_2)_{12}.wH_2O]$ was activated at 400° C. to remove the adsorbed water in the zeolite and stirred with 0.10 g tetra methyl orthosilicate in 100 ml dry toluene. The sample was dried after 5 hrs by evaporating solvent under reduced pressure. The tetra methyl ortho silicate species deposited on the zeolite surface was converted into silica by calcinations of the zeolite at 550° C. A known amount of the sample was activated at 350° C. under vacuum and adsorption measurements were carried out as described earlier. In situ X-ray powder diffraction measurements at various temperatures up to 850° C. shows that the adsorbent has high thermal and hydrothermal stability. The adsorption capacity for oxygen is 3.50 cc/g at 15° C. and 765 mmHg, selectivity for oxygen over nitrogen is 1.5 to 0.95 and selectivity for oxygen over argon is 1.3 to 2.1 in the pressure range studied, the values are given in table-1.

EXAMPLE-3

10.0 g of the zeolite NaA powder $[Na_{12}(AlO_2)_{12}.(SiO_2)_{12}.wH_2O]$ was activated at 400° C. to remove the water adsorbed in the zeolite and stirred with 0.10 g tetra ethyl orthosilicate in 100 ml dry solvent. The sample was dried after 5 hrs by evaporating solvent under reduced pressure. The tetra ethyl ortho silicate species deposited on the zeolite surface was converted into silica by calcinations of the zeolite at 550° C. A known amount of the sample was activated at 350° C. under vacuum and adsorption measurements were carried out as described earlier. In situ X-ray powder diffraction measurements at various temperatures up to 850° C. shows that the adsorbent has high thermal and hydrothermal stability. The adsorption capacity for oxygen is 3.53 cc/g at 15° C. and 765 mmHg, selectivity for oxygen over nitrogen is 1.6 to 1.1 and selectivity for oxygen over argon is 1.3 to 2.2 in the pressure range studied, the values are given in table 1.

EXAMPLE-4

10.0 g of the zeolite NaA powder $[Na_{12}(AlO_2)_{12}.(SiO_2)_{12}.wH_2O]$ was activated at 400° C. to remove the water adsorbed in the zeolite and stirred with 0.15 g tetra ethyl orthosilicate in 100 ml dry toluene. The sample was dried after 5 hrs by evaporating toluene under reduced pressure. The tetra ethyl ortho silicate species deposited on the zeolite surface was converted into silica by calcinations of the zeolite at 550° C. A known amount of the sample was activated at 350° C. under vacuum and adsorption measurements were carried out as described earlier. In situ X-ray powder diffraction measurements at various temperatures up to 850° C. shows that the adsorbent has high thermal and hydrothermal stability. The adsorption capacity for oxygen is 3.15 cc/g at 15° C. and 765 mmHg, selectivity for oxygen over nitrogen is 1.8 to 0.97 and selectivity for oxygen over argon is 2.8 to 3.2 in the pressure range studied, the values are given in table 1.

EXAMPLE-5

10.0 g of the zeolite NaA powder $[Na_{12}(AlO_2)_{12}.(SiO_2)_{12}.wH_2O]$ was activated at 400° C. to remove the water adsorbed in the zeolite and stirred with 0.20 g tetra ethyl orthosilicate in 100 ml dry toluene. The sample was dried after 5 hrs by evaporating toluene under reduced pressure. The tetra ethyl ortho silicate species deposited on the zeolite surface was converted into silica by calcinations of the zeolite at 550° C. A known amount of the sample was activated at 350° C. under vacuum and adsorption measurements were carried-out as described earlier. In situ X-ray powder diffraction measurements at various temperatures up to 850° C. shows that the adsorbent has high thermal and hydrothermal stability. The adsorption capacity for oxygen is 3.78 cc/g at 15° C. and 765 mmHg, selectivity for oxygen over nitrogen is 2 to 1.1 and selectivity for oxygen over argon is 3.0 to 3.4 in the pressure range studied, the values are given in table-1.

EXAMPLE-6

10.0 g of the zeolite NaA powder $[Na_{12}(AlO_2)_{12}.(SiO_2)_{12}.wH_2O]$ was activated at 400° C. to remove the water adsorbed in the zeolite and stirred with 0.25 g tetra ethyl orthosilicate in 100 ml dry toluene. The sample was dried after 5 hrs by evaporating toluene under reduced pressure. The tetra ethyl ortho silicate species deposited on the zeolite surface was converted into silica by calcinations of the zeolite at 500° C. A known amount of the sample was activated at 350° C. under vacuum and adsorption measurements were carried out as described earlier. In situ X-ray powder diffraction measurements at various temperatures up to 850° C. shows that the adsorbent has high thermal and hydrothermal stability. The adsorption capacity for oxygen is 2.42 cc/g at 15° C. and 765 mmHg, selectivity for oxygen over nitrogen is around 2.1 to 1.5 and selectivity for oxygen over argon is 3.5 to 3.8 in the pressure range studied, the values are given in table 1.

EXAMPLE-7

10.0 g of the zeolite NaA powder $[Na_{12}(AlO_2)_{12}.(SiO_2)_{12}.wH_2O]$ was activated at 400° C. to remove the water adsorbed in the zeolite and stirred with 0.30 g tetra ethyl orthosilicate in 100 ml dry toluene. The sample was dried after 5 hrs by evaporating toluene under reduced pressure. The tetra ethyl ortho silicate species deposited on the zeolite surface was, converted into silica by calcinations of the zeolite at 550° C. A known amount of the sample was activated at 350° C. under vacuum and adsorption measurements were carried out as described earlier. In situ X-ray powder diffraction measurements at various temperatures up to 850° C. shows that the adsorbent has high thermal and hydrothermal stability. The adsorption capacity for oxygen is 2.63 cc/g at 15° C. and 765 mmHg, selectivity for oxygen over nitrogen is 2.5 to 1.6 and selectivity for oxygen over argon is 4.6 to 4.7 in the pressure range studied, the values are given in table-1.

EXAMPLE-8

10.0 g of the zeolite NaA powder $[Na_{12}(AlO_2)_{12}.(SiO_2)_{12}.wH_2O]$ was activated at 400° C. to remove the water adsorbed in the zeolite and stirred with 1.00 g tetra ethyl orthosilicate in 100 ml dry toluene. The sample was dried after 5 hrs by evaporating toluene under reduced pressure. The tetra ethyl ortho silicate species deposited on the zeolite surface was converted into silica by calcinations of the zeolite at 550° C. A known amount of the sample was activated at 350° C. under vacuum and adsorption measurements were carried out as described earlier. In situ X-ray powder diffraction measurements at various temperatures up to 850° C. shows that the adsorbent has high thermal and hydrothermal stability. The adsorption capacity for oxygen is 1.32 cc/g at 15° C. and 765 mmHg, selectivity for oxygen over nitrogen is 2.5 to 1.4 and selectivity for oxygen over argon is 2.5 to 3.5 in the pressure range studied, the values are given in table-1.

EXAMPLE-9

10.0 g of the zeolite NaA powder $[Na_{12}(AlO_2)_{12}.(SiO_2)_{12}.wH_2O]$ was activated at 400° C. to remove the water adsorbed in the zeolite and stirred with 0.20 g tetra methyl orthosilicate in 100 ml dry toluene. The sample was dried after 5 hrs by evaporating toluene under reduced pressure. The tetra methyl ortho silicate species deposited on the zeolite surface was converted into silica by calcinations of the zeolite at 550° C. A known amount of the sample was activated at 350° C. under vacuum and adsorption measurements were carried out as described earlier. In situ X-ray powder diffraction measurements at various temperatures up to 850° C. shows that the adsorbent has high thermal and hydrothermal stability. The adsorption capacity for oxygen is 3.77 cc/g at 15° C. and 765 mmHg, selectivity for oxygen over nitrogen is 2.6 to 1.4 and selectivity for oxygen over argon is 3.3 to 4.1 in the pressure range studied, the values are given in table-1.

EXAMPLE-10

10.0 g of the zeolite NaA powder $[Na_{12}(AlO_2)_{12}.(SiO_2)_{12}.wH_2O]$ was activated at 400° C. to remove the water adsorbed in the zeolite and stirred with 0.25 g tetra methyl orthosilicate in 100 ml dry benzene. The sample was dried after 5 hrs by evaporating benzene under reduced pressure. The tetra methyl ortho silicate species deposited on the zeolite surface was converted into silica by calcinations of the zeolite at 500° C. A known amount of the sample was activated at 350° C. under vacuum and adsorption measurements were carried out as described earlier. In situ X-ray powder diffraction measurements at various temperatures up to 850° C. shows that the adsorbent has high thermal and hydrothermal stability. The adsorption capacity for oxygen is 2.85 cc/g at 15° C. and 765 mmHg, selectivity for oxygen over nitrogen is 2.4 to 1.3 and selectivity for oxygen over argon is 4.0 to 4.3 in the pressure range studied, the values are given in table-1.

EXAMPLE-11

10.0 g of the zeolite NaA powder [$Na_{12}(AlO_2)_{12}.(SiO_2)_{12}.wH_2O$] was activated at 400° C. to remove the water adsorbed in the zeolite and stirred with 0.20 g tetra ethyl orthosilicate in 100 ml dry benzene. The sample was dried after 5 hrs by evaporating benzene under reduced pressure. The tetra ethyl ortho silicate species deposited on the zeolite surface was converted into silica by calcinations of the zeolite at 550° C. A known amount of the sample was activated at 350° C. under vacuum and adsorption measurements were carried out as described earlier. In situ X-ray powder diffraction measurements at various temperatures up to 850° C. shows that the adsorbent has high thermal and hydrothermal stability. The adsorption capacity for oxygen is 3.79 cc/g at 15° C. and 765 mmHg, selectivity for oxygen over nitrogen is 2.4 to 1.2 and selectivity for oxygen over argon is 3.6 to 4.0 in the pressure range studied, the values are given in table-1.

EXAMPLE-12

10.0 g of the zeolite NaA powder [$Na_{12}(AlO_2)_{12}.(SiO_2)_{12}.wH_2O$] was activated at 400° C. to remove the water adsorbed in the zeolite and stirred with 0.25 g tetra ethyl orthosilicate in 100 ml dry cyclohexane. The sample was dried after 5 hrs by evaporating cyclohexane under reduced pressure. The tetra ethyl ortho silicate species deposited on the zeolite surface was converted into silica by calcinations of the zeolite at 600° C. A known amount of the sample was activated at 350° C. under vacuum and adsorption measurements were carried out as described earlier. In situ X-ray powder diffraction measurements at various temperatures up to 850° C. shows that the adsorbent has high thermal and hydrothermal stability. The adsorption capacity for oxygen is 2.92 cc/g at 15° C. and 765 mmHg, selectivity for oxygen over nitrogen 2.6 to 1.5 and selectivity for oxygen over argon is 4.5 to 4.8 in the pressure range studied, the values are given in table-1.

EXAMPLE-13

10.0 g of the zeolite NaA powder [$Na_{12}(AlO_2)_{12}.(SiO_2)_{12}.wH_2O$] was activated at 400° C. to remove the water adsorbed in the zeolite and stirred with 0.25 g tetra methyl orthosilicate in 100 ml dry cyclohexane. The sample was dried after 5 hrs by evaporating cyclohexane under reduced pressure. The tetra methyl ortho silicate species deposited on the zeolite surface was converted into silica by calcinations of the zeolite at 550° C. A known amount of the sample was activated at 350° C. under vacuum and adsorption measurements were carried out as described earlier. In situ X-ray powder diffraction measurements at various temperatures up to 850° C. shows that the adsorbent has high thermal and hydrothermal stability. The adsorption capacity for oxygen is 2.87 cc/g at 15° C. and 765 mmHg, selectivity for oxygen over nitrogen is 2.8 to 1.5 and selectivity for oxygen over argon is 4.7 to 4.9 in the pressure range studied, the values are given in table-1.

EXAMPLE-14

10.0 g of the zeolite NaA powder [$Na_{12}(AlO_2)_{12}.(SiO_2)_{12}.wH_2O$] was activated at 400° C. to remove the water adsorbed in the zeolite and stirred with 0.25 g tetra ethyl orthosilicate in 100 ml dry xylene. The sample was dried after 5 hrs by evaporating xylene under reduced pressure. The tetra ethyl ortho silicate species deposited on the zeolite surface was converted into silica by calcinations of the zeolite at 550° C. A known amount of the sample was activated at 350° C. under vacuum and adsorption measurements were carried out as described earlier. In situ X-ray powder diffraction measurements at various temperatures up to 850° C. shows that the adsorbent has high thermal and hydrothermal stability. The adsorption capacity for oxygen is 2.93 cc/g at 15° C. and 765 mmHg, selectivity for oxygen over nitrogen is 2.4 to 1.4 and selectivity for oxygen over argon is 4.3 to 4.5 in the pressure range studied, the values are given in table-1.

EXAMPLE-15

10.0 g of the zeolite NaA powder [$Na_{12}(AlO_2)_{12}.(SiO_2)_{12}.wH_2O$] was activated at 400° C. to remove the water adsorbed in the zeolite and stirred with 0.25 g tetra methyl orthosilicate in 100 ml dry xylene. The sample was dried after 5 hrs by evaporating xylene under reduced pressure. The tetra methyl ortho silicate species deposited on the zeolite surface was converted into silica by calcinations of the zeolite at 650° C. A known amount of the sample was activated at 350° C. under vacuum and adsorption measurements were carried out as described earlier. In situ X-ray powder diffraction measurements at various temperatures up to 850° C. shows that the adsorbent has high thermal and hydrothermal stability. The adsorption capacity for oxygen is 2.77 cc/g at 15° C. and 765 mmHg, selectivity for oxygen over nitrogen is 2.3 to 1.3 and selectivity for oxygen over argon is 4.7 to 4.8 in the pressure range studied, the values are given in table-1.

The adsorption capacity and selectivity of all the 15 samples are enumerated in the Table-1.

The main advantages of the present invention include:

1. The adsorbent, prepared by the modification of zeolite A shows oxygen selectivity over nitrogen and argon.
2. The adsorbent is prepared by a simple liquid phase alkoxide deposition.
3. The alkoxide deposition is uniform on the zeolite surface.
4. The alkoxide deposition is carried out at ambient temperature and pressure.
5. The solvent used for the alkoxide deposition can be recovered by distillation methods.
6. The adsorbent shows very high thermal and hydrothermal stability.
7. The adsorbent shows oxygen/argon selectivity nearly 4.9 in the pressure range studied.
8. The adsorbent is useful in the commercial separation and purification of nitrogen and argon from its mixture with oxygen.
9. The adsorbent is useful for the chromatographic separation of oxygen nitrogen and argon.

TABLE 1

Oxygen, Nitrogen and Argon Adsorption Capacities and Selectivity for Various Adsorbents at 15° C. & 765 mmHg

| | Equilibrium Adsorption Capacity (ccg$^{-1}$) | | | Adsorption Selectivity | | | | | |
|---|---|---|---|---|---|---|---|---|---|
| | | | | $\alpha O_2/N_2$ | | $\alpha O_2/Ar$ | | $\alpha N_2/Ar$ | |
| | | | | 100 mmHg | 765 mmHg | 100 mmHg | 765 mmHg | 100 mmHg | 765 mmHg |
| | Oxygen | Nitrogen | Argon | | | | | | |
| Example-1 | 3.48 | 10.77 | 3.02 | 0.30 | 0.32 | 1.22 | 1.1 | 4.0 | 3.5 |
| Example-2 | 3.50 | 3.61 | 2.59 | 1.5 | 0.95 | 2.1 | 1.3 | 2.0 | 1.4 |
| Example-3 | 3.53 | 3.10 | 1.60 | 1.6 | 1.1 | 2.2 | 1.3 | 2.0 | 1.9 |
| Example-4 | 3.15 | 3.28 | 1.11 | 1.8 | 0.97 | 3.2 | 2.8 | 3.0 | 2.9 |
| Example-5 | 3.78 | 3.71 | 1.25 | 2.0 | 1.1 | 3.4 | 3.0 | 3.1 | 2.9 |
| Example-6 | 2.42 | 1.57 | 0.69 | 2.1 | 1.5 | 3.8 | 3.5 | 2.5 | 2.2 |
| Example-7 | 2.63 | 1.61 | 0.57 | 2.5 | 1.6 | 4.7 | 4.6 | 3.0 | 2.8 |
| Example-8 | 1.32 | 0.87 | 0.51 | 2.5 | 1.4 | 3.5 | 2.5 | 1.9 | 1.7 |
| Example-9 | 3.77 | 3.63 | 1.15 | 2.6 | 1.4 | 4.1 | 3.3 | 3.4 | 3.1 |
| Example-10 | 2.85 | 1.61 | 0.70 | 2.4 | 1.3 | 4.3 | 4.0 | 2.5 | 2.3 |
| Example-11 | 3.79 | 3.49 | 1.05 | 2.4 | 1.2 | 4.0 | 3.6 | 3.6 | 3.5 |
| Example-12 | 2.92 | 1.47 | 0.64 | 2.6 | 1.5 | 4.8 | 4.5 | 2.3 | 2.3 |
| Example-13 | 2.87 | 1.44 | 0.61 | 2.8 | 1.5 | 4.9 | 4.7 | 2.4 | 2.3 |
| Example-14 | 2.93 | 1.56 | 0.67 | 2.4 | 1.4 | 4.5 | 4.3 | 2.5 | 2.3 |
| Example-15 | 2.77 | 1.60 | 0.59 | 2.3 | 1.3 | 4.8 | 4.7 | 2.4 | 2.3 |

What is claimed is:

1. A process for the preparation of a molecular sieve adsorbent for the size/shape selective separation of air, which comprises (1) activating a commercially available zeolite A at a temperature in the range of from 350 to 450° C. to eliminate physically adsorbed water, for a period of time ranging from 3 to 6 hours; (2) cooling the activated zeolite in a desiccator under vacuum in the range of from $1\times10^{-2}$ to $1\times10^{-4}$ mm Hg; (3) treating the cooled zeolite with tetra alkyl ortho silicate dissolved in a dry solvent at a concentration ranging from 0.1 to 1.0 wt. %/volume for a specified period of time in the range of from 4 to 8 hours under continuous stirring; (4) recovering the solvent by conventional techniques for re-use; (5) drying the treated zeolite in air in static condition at an ambient temperature in the range of from 20 to 35° Celsius to provide a modified zeolite; (6) heating the modified zeolite to a temperature in the range of from 450 to 600° Celsius for a period of time ranging from 3 to 8 hours; and (7) cooling the zeolite at ambient temperature in static conditions to provide the molecular sieve adsorbent having a preferential oxygen adsorption selectivity over nitrogen and argon.

2. The process as claimed in claim 1, wherein from 0.10 to 1.00 weight percent of tetra alkyl ortho silicate was deposited uniformly on the zeolite surface from its dry solution in the dry solvent.

3. The process as claimed in claim 2, wherein the said tetra alkyl ortho silicate deposition on the zeolite surface was carried out in a simple liquid phase reaction at ambient temperature and pressure conditions.

4. The process as claimed in claim 3 wherein the tetra alkyl ortho silicate deposited on the zeolite surface was converted into silica by calcination in air at 500 to 650° C. for 3 to 6 hours.

5. The process as claimed in claim 4 wherein the adsorbent as prepared is useful for the separation and purification of nitrogen and argon from its mixture with oxygen.

6. The process as claimed in claim 5 wherein the adsorbent as prepared is useful for the chromatographic separation of oxygen, nitrogen and argon from its mixture.

7. The process as claimed in claim 3 wherein the adsorbent as prepared is useful for the separation and purification of nitrogen and argon from its mixture with oxygen.

8. The process as claimed in claim 3 wherein the adsorbent as prepared is useful for the chromatographic separation of oxygen, nitrogen and argon from its mixture.

9. The process as claimed in claim 2 wherein the tetra alkyl ortho silicate deposited on the zeolite surface was converted into silica by calcination in air at 500 to 650° C. for 3 to 6 hours.

10. The process as claimed in claim 1, wherein the said tetra alkyl ortho silicate deposition on the zeolite surface was carried out in a simple liquid phase reaction at ambient temperature and pressure conditions.

11. The process as claimed in claim 1 wherein the tetra alkyl ortho silicate deposited on the zeolite surface was converted into silica by calcination in air at 500 to 650° C. for 3 to 6 hours.

12. The process as claimed in claim 1 wherein the adsorbent as prepared is useful for the separation and purification of nitrogen and argon from its mixture with oxygen.

13. The process as claimed in claim 1 wherein the adsorbent as prepared is useful for the chromatographic separation of oxygen, nitrogen and argon from its mixture.

14. The process as claimed in claim 1 wherein the tetra alkyl ortho silicate deposited on the zeolite surface was converted into silica by calcination in air at 550° C. for 4 hours.

15. The process as claimed in claim 1 wherein the commercially available zeolite A comprises a sodium zeolite A having the general formula, $(Na_2O)_6 \cdot (Al_2O_3)_6 \cdot (SiO_2)_{12+x} \cdot wH_2O_n$ where the value of x varies from 0.001 to 0.1, and w is the number of moles of water.

* * * * *